United States Patent
Shepherd

(10) Patent No.: US 8,011,867 B2
(45) Date of Patent: Sep. 6, 2011

(54) FLUSH CAPTIVE SCREW WITH RETRACTABLE KNURLED KNOB

(75) Inventor: Jason A. Shepherd, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 455 days.

(21) Appl. No.: 12/055,013

(22) Filed: Mar. 25, 2008

(65) Prior Publication Data

US 2009/0245970 A1    Oct. 1, 2009

(51) Int. Cl.
*F16B 23/00* (2006.01)

(52) U.S. Cl. ......... 411/396; 411/107; 411/383; 411/384

(58) Field of Classification Search .......... 411/383–384, 411/396, 402, 408–410, 418–419, 107, 353, 411/375; 401/109, 112; 24/DIG. 35, 458; 361/704, 707, 709, 719, 724; 81/442–449, 81/451–458; 165/80.3; 16/85, 429, DIG. 10; 257/718; 174/16.3; 292/1, 332, DIG. 4
See application file for complete search history.

(56) References Cited

U.S. PATENT DOCUMENTS

| | | | | |
|---|---|---|---|---|
| 2,722,914 A * | 11/1955 | Aversa | | 401/105 |
| 3,346,032 A * | 10/1967 | Gulistan | | 411/349 |
| 3,368,602 A * | 2/1968 | Boyd | | 411/105 |
| 4,309,123 A * | 1/1982 | Moore | | 403/408.1 |
| 4,343,559 A | 8/1982 | Silver | | |
| 4,387,497 A * | 6/1983 | Gulistan | | 29/511 |
| 5,012,709 A * | 5/1991 | Su | | 81/466 |
| 5,382,124 A * | 1/1995 | Frattarola | | 411/352 |
| 5,518,330 A | 5/1996 | Gervais et al. | | |
| 5,530,999 A * | 7/1996 | Barnes | | 24/573.11 |
| 5,544,992 A | 8/1996 | Ciobanu et al. | | 411/353 |
| 5,611,654 A * | 3/1997 | Frattarola et al. | | 411/432 |
| 5,642,972 A * | 7/1997 | Ellis et al. | | 411/353 |
| 6,238,155 B1 * | 5/2001 | Aukzemas et al. | | 411/107 |
| 6,280,110 B2 * | 8/2001 | Lin | | 401/106 |
| 6,280,131 B1 * | 8/2001 | Ellis et al. | | 411/353 |
| 6,547,470 B2 | 4/2003 | Legg | | |
| 6,669,423 B2 | 12/2003 | Smith | | |
| 6,874,985 B2 * | 4/2005 | Hein et al. | | 411/371.2 |
| 7,083,371 B2 * | 8/2006 | McAfee | | 411/107 |
| 7,237,291 B2 * | 7/2007 | Redford | | 7/138 |
| 7,241,096 B2 | 7/2007 | Smith et al. | | |
| 2001/0041110 A1 * | 11/2001 | Ellis et al. | | 411/84 |
| 2006/0291977 A1 * | 12/2006 | Smith et al. | | 411/353 |

* cited by examiner

*Primary Examiner* — Victor Batson
*Assistant Examiner* — Robert A Delisle
(74) *Attorney, Agent, or Firm* — Larson Newman, LLP

(57) ABSTRACT

A mounting device for a screw including a head and a tip, the mounting device comprising a body and a plunger. The body is attachable to the head of the screw, and the plunger is adapted to extend from within the body upon receiving a downward force. Additionally, the plunger includes a plurality of knurls adapted to transfer torque to the tip of the screw.

11 Claims, 11 Drawing Sheets

3-3

4-4

FLUSH CAPTIVE SCREW WITH RETRACTABLE KNURLED KNOB

FIELD OF THE DISCLOSURE

This disclosure relates generally to information handling systems, and relates more particularly to mounting screws for information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In the manufacture of personal computers, a large number of components are typically assembled in a relatively small housing. Screw and nut coupling is often preferred for these tasks over other coupling techniques to satisfy mechanical shock and vibration requirements and to satisfy the certification requirements of standards bodies. In particular, captive screws are known that insert into mated nuts in order to reduce the risk that a loose, misplaced or lost fastener will cause damage to electronic components, such as shorting out the electronic components. A typical personal computer or server may have six or more components that are secured in place with captive screws.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

Figure 1:
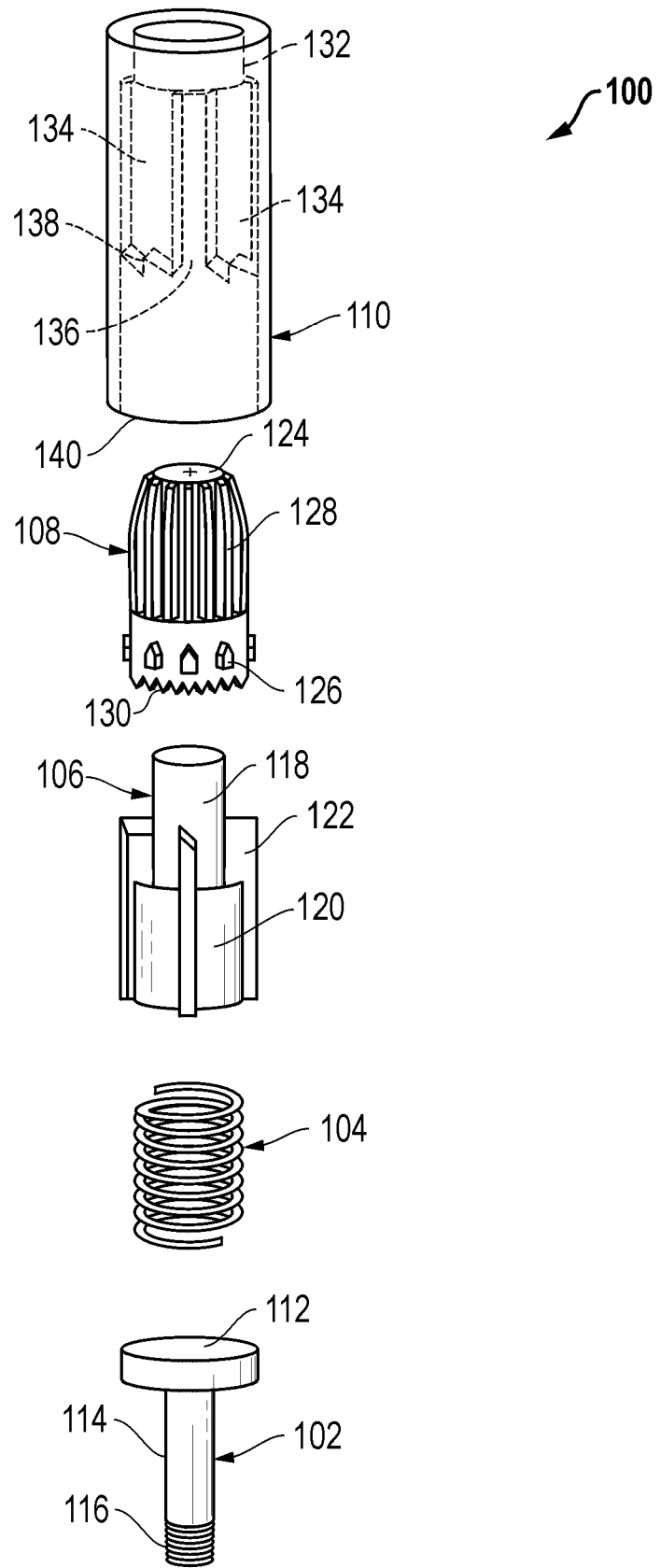
FIG. 1 is an exploded perspective view of a mounting device.

FIG. 1 shows a mounting device 100 for an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

The mounting device 100 includes a screw 102, a spring 104, a ratchet 106, a plunger 108, and a body 110. The screw 102 has a head 112, a shaft 114, and a tip 116. The ratchet 106 includes a top 118, a bottom 120, and a plurality of ridges 122 circumferentially disposed around the exterior of the ratchet. The plunger 108 includes a top 124, a plurality of circumferential keys 126, a plurality of circumferential knurls 128, and a plurality of saw teeth 130 circumferentially disposed around the bottom diameter of the plunger. The body 110 includes a lip 132, a plurality of ridges 134, a plurality of channels 136, a plurality of catches 138 at the bottom of the ridges, and a bottom 140. The ridges 134 and the channels 136 are disposed circumferentially around the interior of the body 110. The channels 136 are adapted to receive the ridges 122 of the ratchet 106. The catches 138 can be indentions in the interior of the body 110 at the bottom of the ridges 134, adapted to selectively receive the tips of the ridges 122.

A distal end of the spring 104 may be placed in physical communication with the head 112 of the screw 102. The bottom 120 of the ratchet 106 may be placed in physical communication with a proximal end of the spring 104. The plunger 108 is adapted to surround the top 118 of the ratchet 106 such that the saw teeth 130 of the plunger rest on the tips of the ridges 122 of the ratchet. The body 110 may be placed over the spring 104, the ratchet 106, and the plunger 108, and the bottom 140 of the body may be permanently affixed to the head 112 of the screw 102. In the embodiment of the mounting device 100 shown, the plunger 108 has a circular exterior perimeter; however in different embodiments, the exterior perimeter of the plunger can be any shape, such as square, triangular, and the like.

Figure 2:
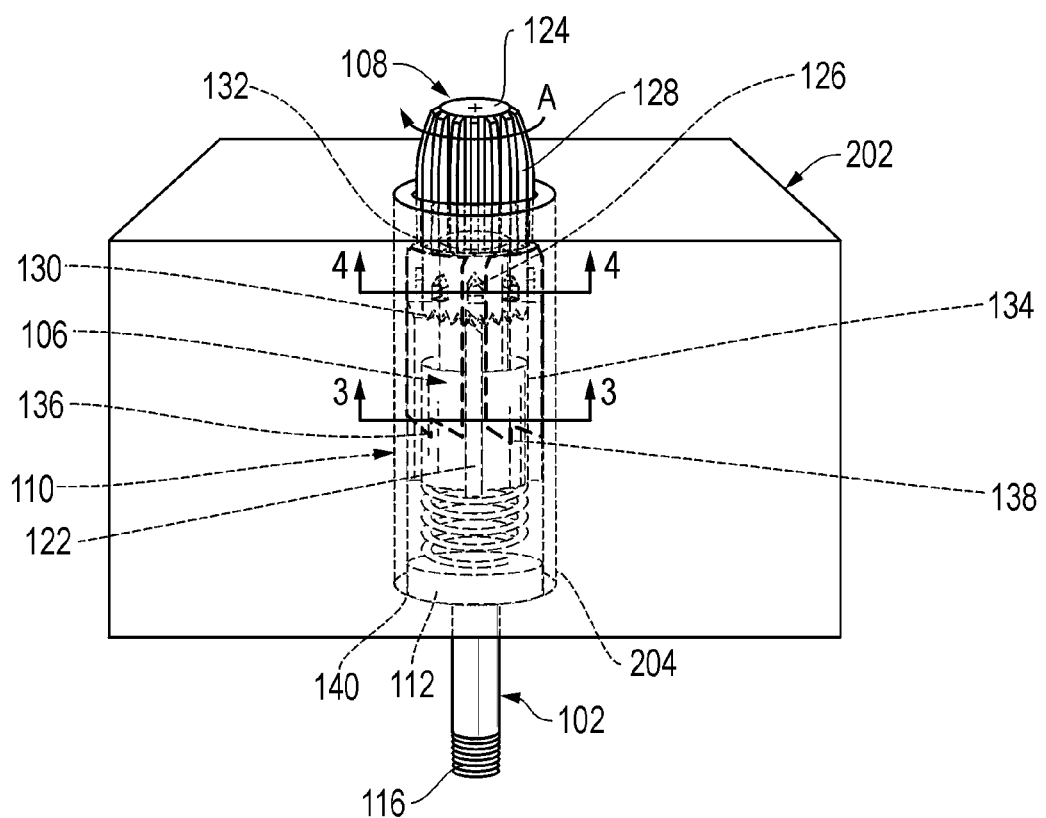
FIG. 2 is a perspective view of the mounting device installed in an extended position within a component.
Figure 3:
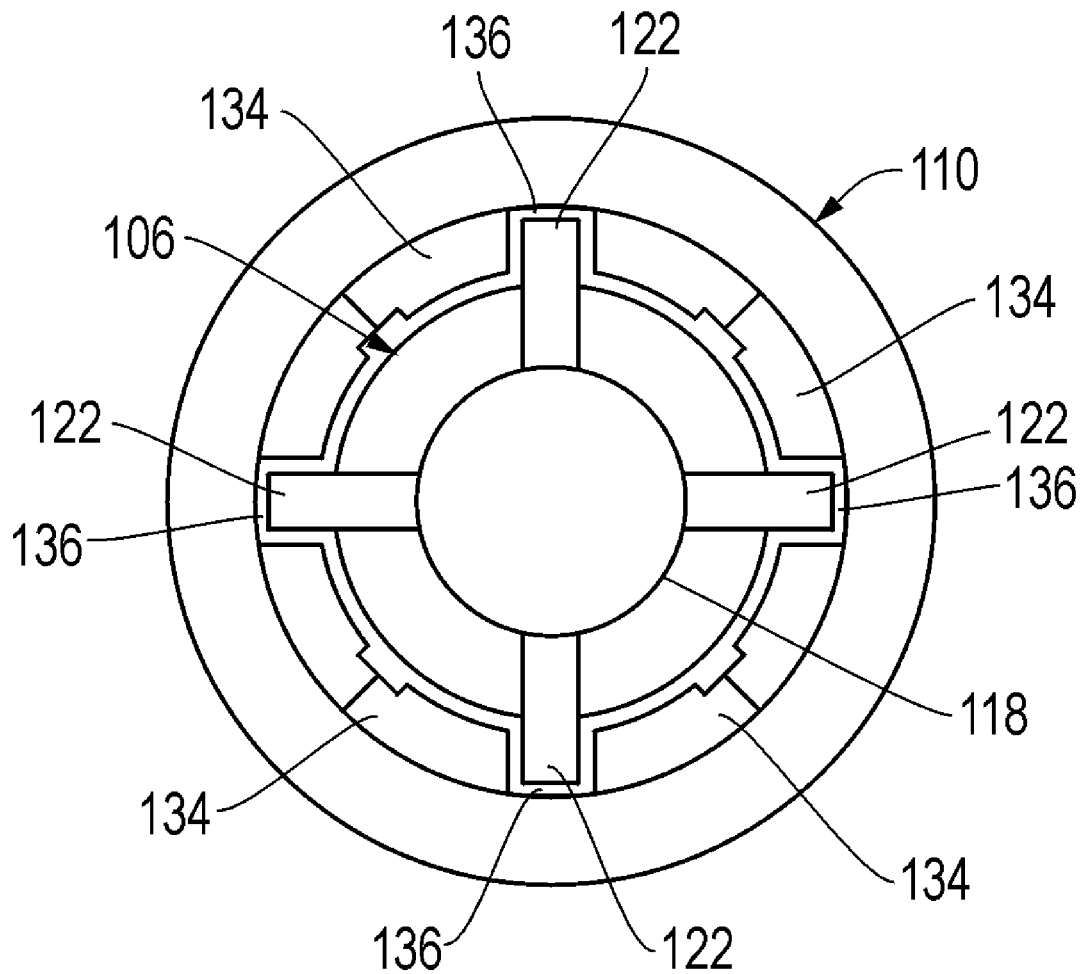
FIG. 3 is a cross-sectional view of the mounting device taken along line 3-3 in FIG. 2.

FIG. 2 shows the mounting device 100 installed in an extended position within a component 202, so that the mounting device can be used to secure the component in a desired location. The component 202 can be a shroud cover or any other device to be mounted in an information handling system. The body 110 is in physical communication with an opening 204 of the component 202. The spring 104 can provide upward force on the ratchet 106 and the plunger 108, such that the plunger can extend from within the body 110 to the position as shown. The top 124 of the plunger 108 can extend beyond the lip 132 of the body 110 until the keys 126 of the plunger come into physical contact with the lip. Thus, the lip 132 of the body 110 and the keys 126 of the plunger 108 can prevent the plunger from completely extending beyond the body. Additionally, the ridges 122 of the ratchet 106 can rest within the channels 136 of the body 110 as shown in FIG. 3.

Figure 4:
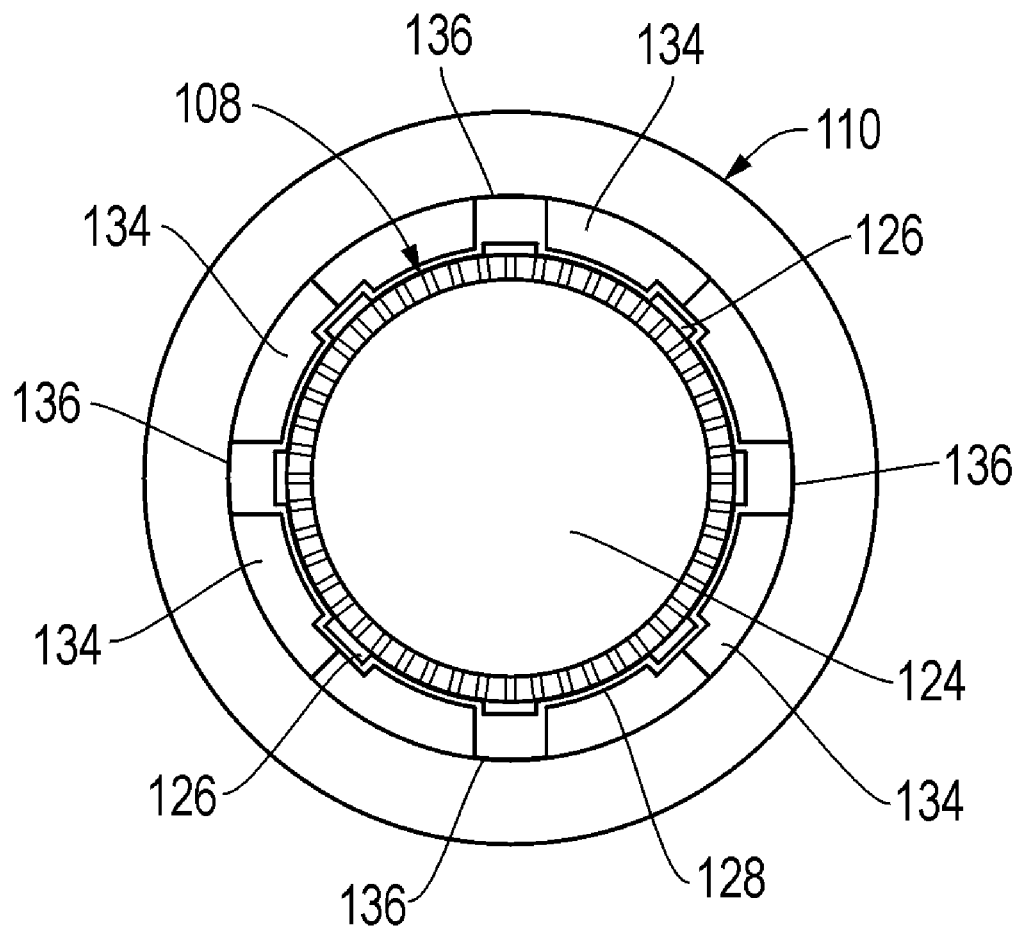
FIG. 4 is a cross-sectional view of the mounting device taken along line 4-4 in FIG. 2.

While the mounting device 100 is in the extended position, the knurls 128 of the plunger 108 can aid a user of the mounting device 100 in applying rotational torque to the plunger 108 in the direction of arrow A, and thus to the tip 116 of the screw 102 to tighten the screw and hold the component 202 in the desired location. The keys 126 of the plunger 108 fit within the channels 136 of the ridges 134 of the body 110, as shown in FIG. 4. As the user applies rotational torque to the plunger 108, the keys 126 engage the ridges 134 to rotate the body 110. A smooth outer surface of the body 110 can allow the body to rotate within the opening 204. The body 110 frictionally engages the head 112 of the screw 102 such that torque is transferred to the screw. Additionally or alternatively, a screw driver or similar tool may be placed in physical communication with the top 124 of the plunger 108 such that rotational torque can be applied to the plunger 108 and the screw 102.

Figure 5:
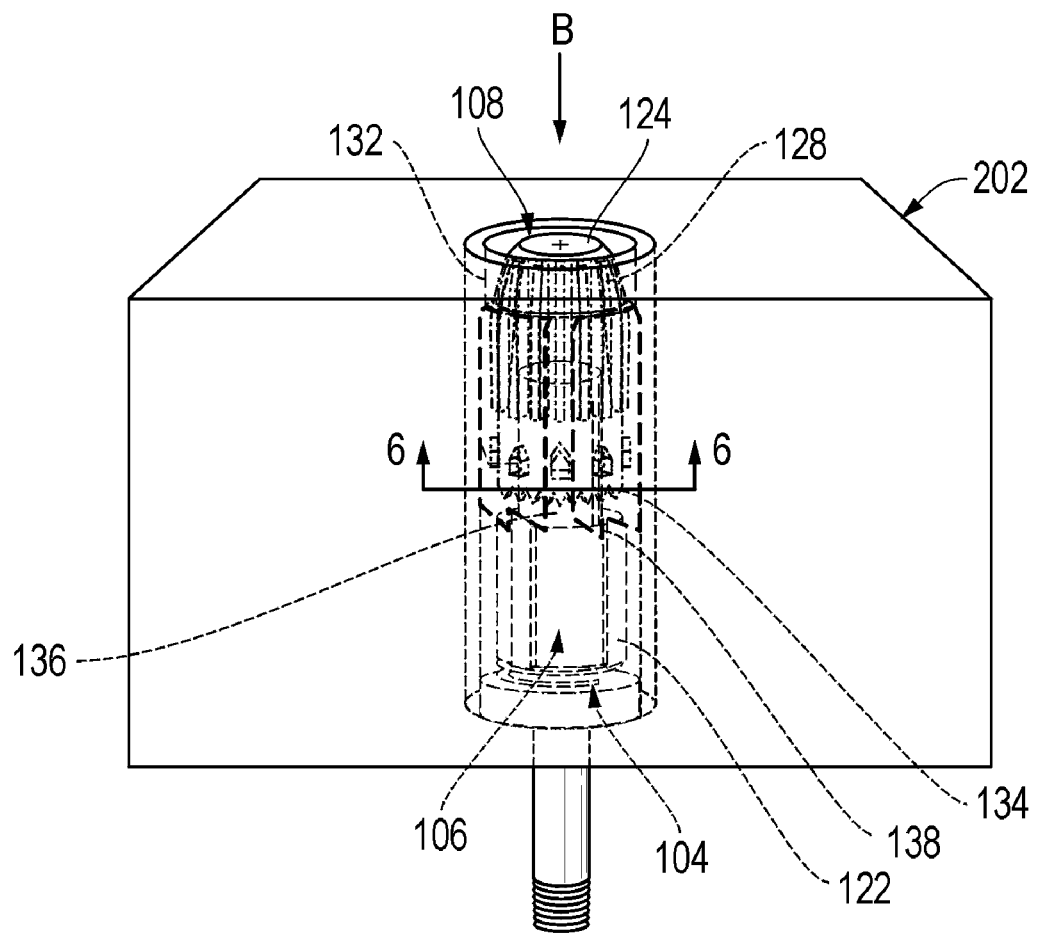
FIG. 5 is a perspective view of the mounting device installed in a closed position within the component.
Figure 6:
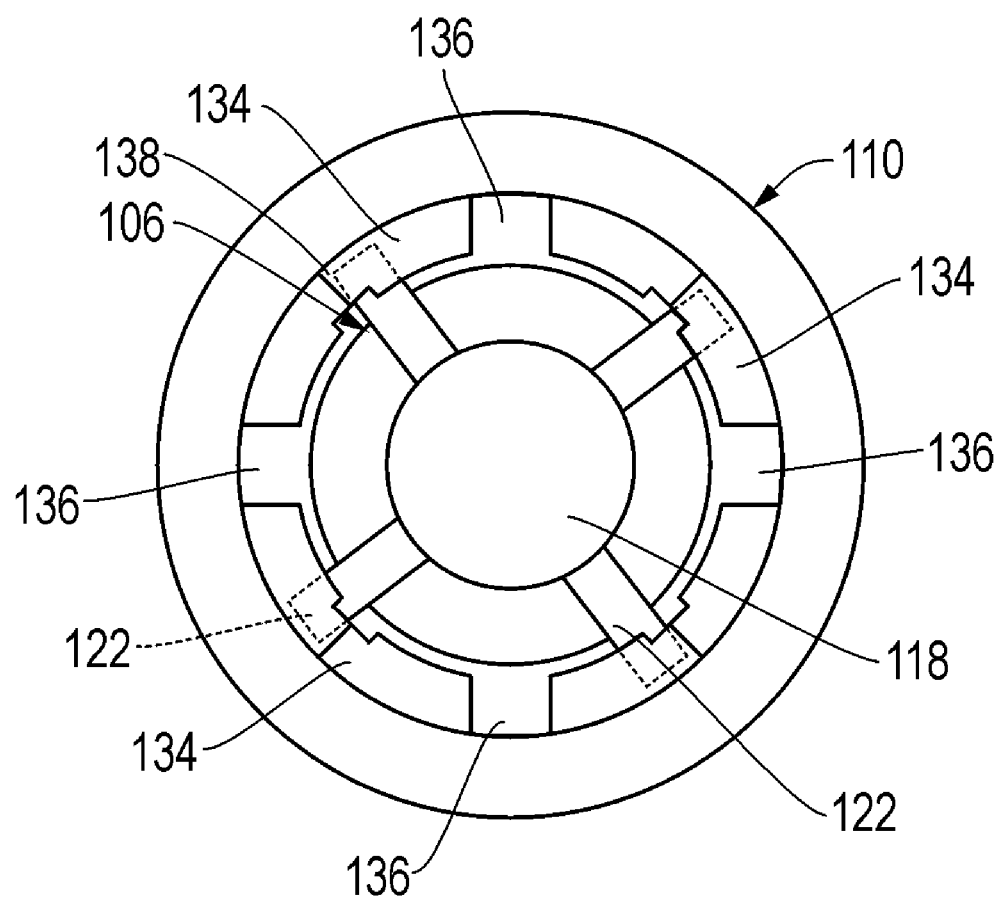
FIG. 6 is a cross-sectional view of the mounting device taken along line 6-6 in FIG. 5.

FIG. 5 shows the plunger 108 within the body 110. After the component 202 is connected, the mounting device 100 preferably is placed in the closed position. However, if the mounting device 100 is in the extended position, the plunger can be depressed and/or put into the closed position by any contact force. Upon the application of a downward force, in the direction of arrow B, the plunger 108 can force the ratchet 106 downward. As the ratchet 106 is pressed downward, its ridges 122 can slide one step within the body 110. For example, if the ridges 122 were held in the channels 136 of the body 110 (as shown in FIGS. 2 and 3), then during the step the ridges can slide down the channels of the body and be forced one step over in the saw teeth 130 of the plunger 108. Then as the plunger 108 is released, the tips of the ridges 122 of the ratchet 106 can come in contact with the ridges 134 of the body 110 and then slide into the catches 138 on the bottom of the ridges of the body (as shown in FIGS. 5 and 6). Thus, the ridges 122 of the ratchet 106 can move within the channels 136 and the catches 138 of the body 110, and can control the extending and closing of the plunger 108 within the body.

Depending on the embodiment, the top 124 of the plunger 108 can either sit slightly above the lip 132 of the body 110, or can sit flush with the lip (as shown in FIG. 5) while the mounting device 100 is in the closed position. The mounting device 100 can be held in the closed position by the ridges 122 of the ratchet 106 sitting in the catches 138 of the body 110. Thus, the spring 104 can be held in a compressed position where the top 124 of the plunger 108 does not extend beyond the lip 132 of the body 110.

FIGS. 7-10 show an alternate embodiment of a mounting device 700 including a screw 702, a spring 704, a ratchet 706, a plunger 708, and a body 710. The screw 702 has a head 712, a shaft 714, and a tip 716. The ratchet 706 includes a top 718, a bottom 720, and a plurality of ridges 722 circumferentially disposed around the exterior of the ratchet. The plunger 708 includes a top 724, a plurality of circumferential keys 726, a plurality of circumferential knurls 728, a plurality of saw teeth 730 circumferentially disposed around the bottom diameter of the plunger, and an opening 742. The body 710 includes a lip 732, a plurality of ridges 734, a plurality of channels 736, a plurality of catches 738 at the bottom of the ridges, and a bottom 740. The ridges 734 and the channels 736 are disposed circumferentially around the interior of the body 710. The channels 736 can be adapted to receive the ridges 722 of the ratchet 706. The catches 738 can be indentions in the interior of the body 710 at the bottom of the ridges 734, adapted to selectively receive the tips of the ridges 722.

A distal end of the spring 704 may be placed in physical communication with the head 712 of the screw 702. The bottom 720 of the ratchet 706 may be placed in physical communication with a proximal end of the spring 704. The plunger 708 is adapted to surround the top 718 of the ratchet 706 such that the saw teeth 730 of the plunger rest on the tips of the ridges 122 of the ratchet. The body 710 may be placed over the spring 704, the ratchet 706, and the plunger 708, and the bottom 740 of the body may be permanently affixed to the head 712 of the screw 702.

The mounting device 700 can perform the same functions and has the same features as the mounting device 100, except that the ratchet 706 and the plunger 708 are hollow. Therefore, the top 718 and the bottom 720 of the ratchet 706 and the top 724 and the bottom 726 of the plunger 708 include openings, such as the opening 742 of the plunger, adapted to allow the screw driver to pass through the ratchet and the plunger. Thus, the screw driver can be placed in physical communication with the head 712 of the screw 702 and the rotational torque can be applied directly to the screw. The user can also provide rotational torque to the tip 716 of the screw 702 with the aid of the knurls 728 of the plunger 708. The screw driver can be used to provide rotational torque to the tip 716 of the screw 702 while the mounting device 700 is in both the extended and closed positions.

Figure 7:
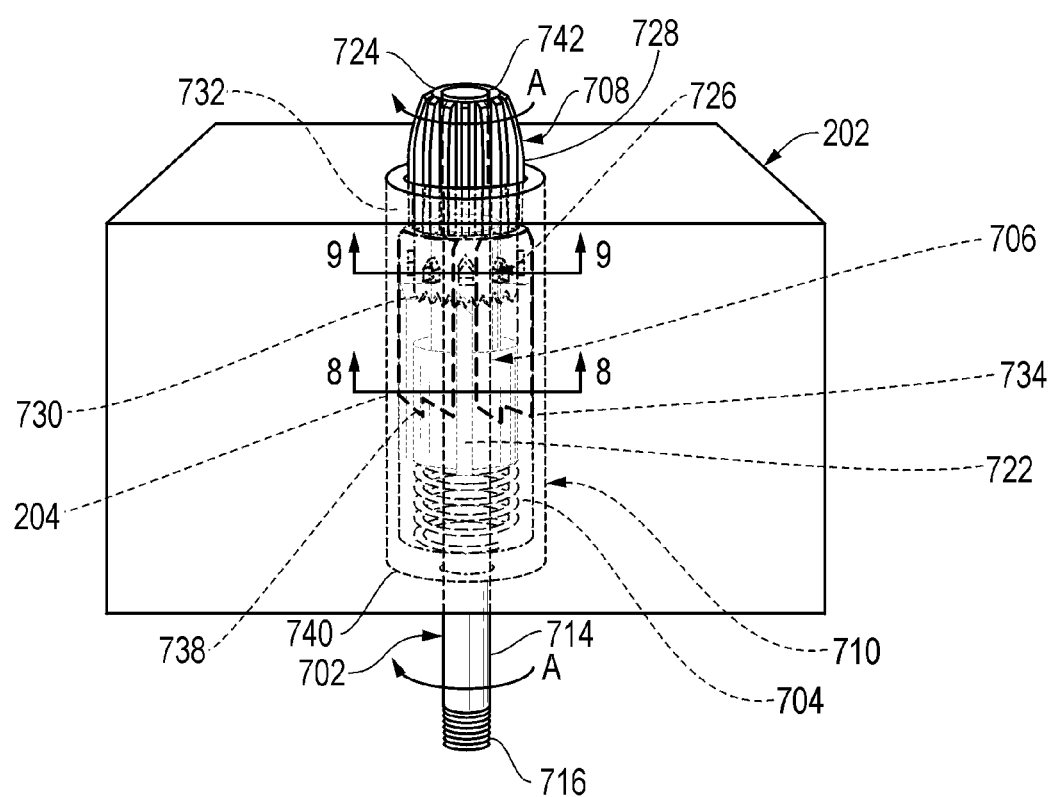
FIG. 7 is a perspective view of an alternative embodiment of the mounting device installed in the extended position within the component.
Figure 8:
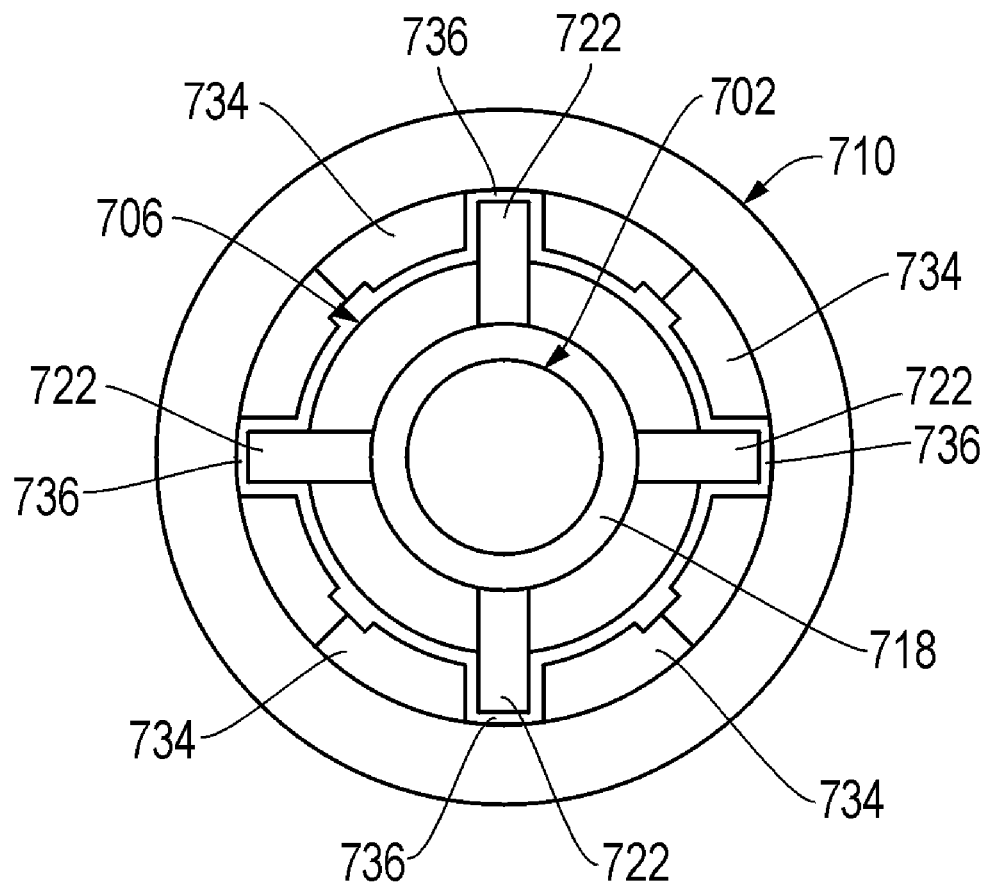
FIG. 8 is a cross-sectional view of the mounting device taken along line 8-8 in FIG. 7.

FIG. 8 shows a cross-sectional view of the mounting device 700 taken along line 8-8 in FIG. 7. The ratchet 706 is within the body 710 with the ridges 722 of the ratchet fitting within the channels 736 of the body. Additionally, the screw 702 extends within the ratchet 706, such that the screw driver can be placed in physical contact with the screw and the rotational torque can be applied directly from the screw driver to the screw.

Figure 9:
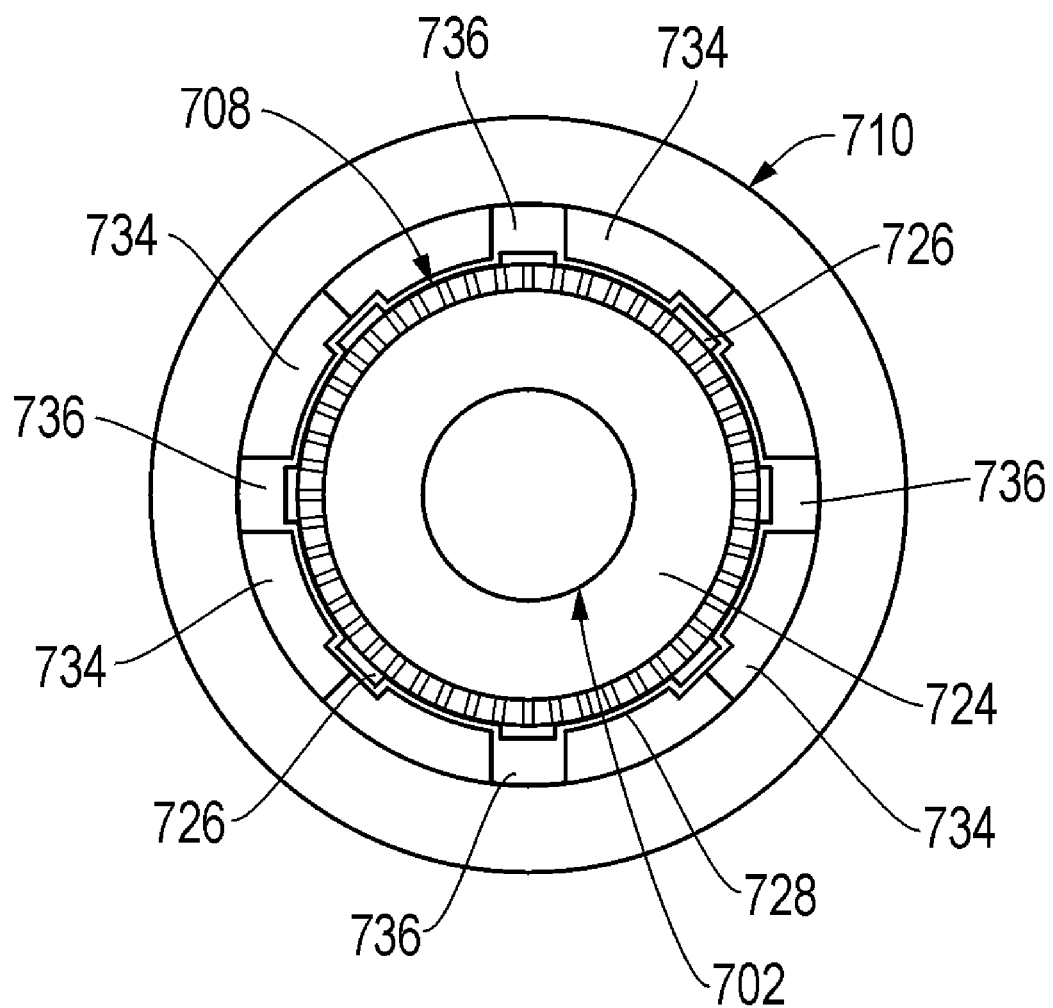
FIG. 9 is a cross-sectional view of the mounting device taken along line 9-9 in FIG. 7.
Figure 10:
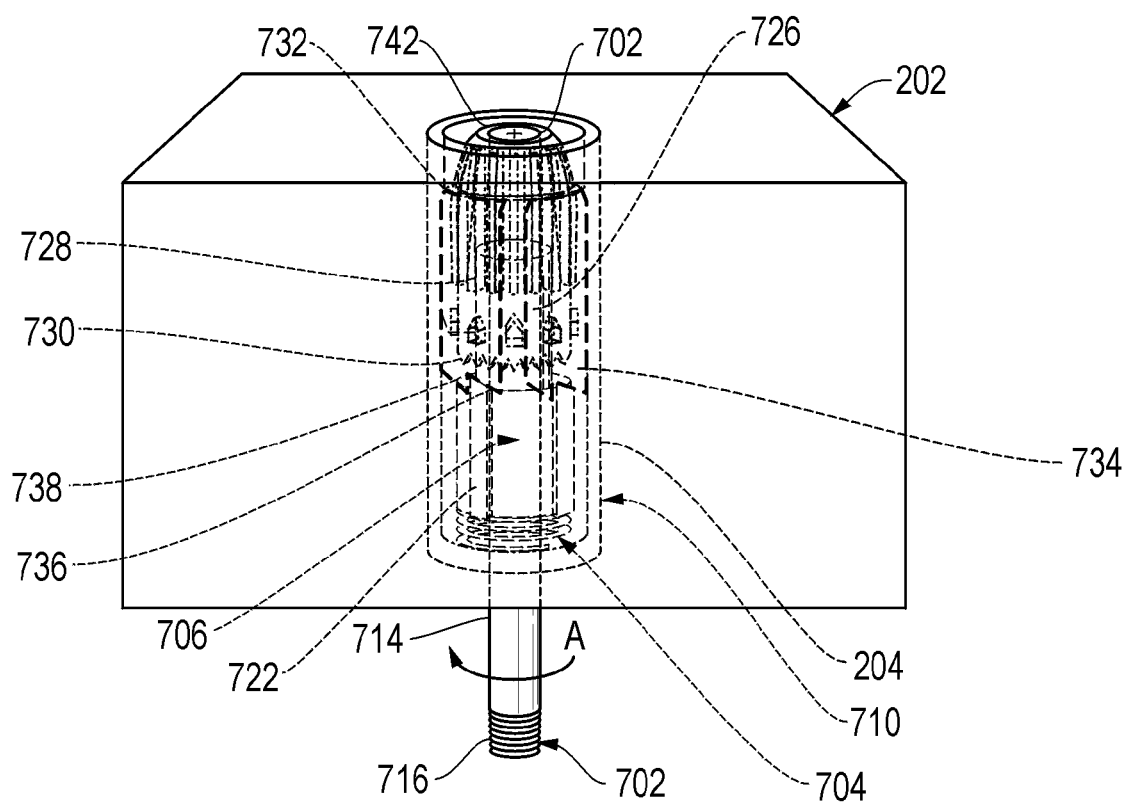
FIG. 10 is a perspective view of the alternative embodiment of the mounting device installed in the closed position within the component.

FIG. 9 shows a cross-sectional view of the mounting device 700 taken along line 9-9 in FIG. 7. The plunger 708 is located within the body 710 with the keys 726 fitting in the channels 736 of the ridges 734 of the body. As the user applies rotational torque to the top 724 of the plunger 708 with the knurls 728, the keys 726 can transfer the rotational torque to the body 710 through physical contact with the ridges 734. Additionally, the screw 702 extends within the plunger 708, such that the screw driver can be placed in physical contact with the screw and the rotational torque can be applied directly from the screw driver to the screw.

Figure 11:
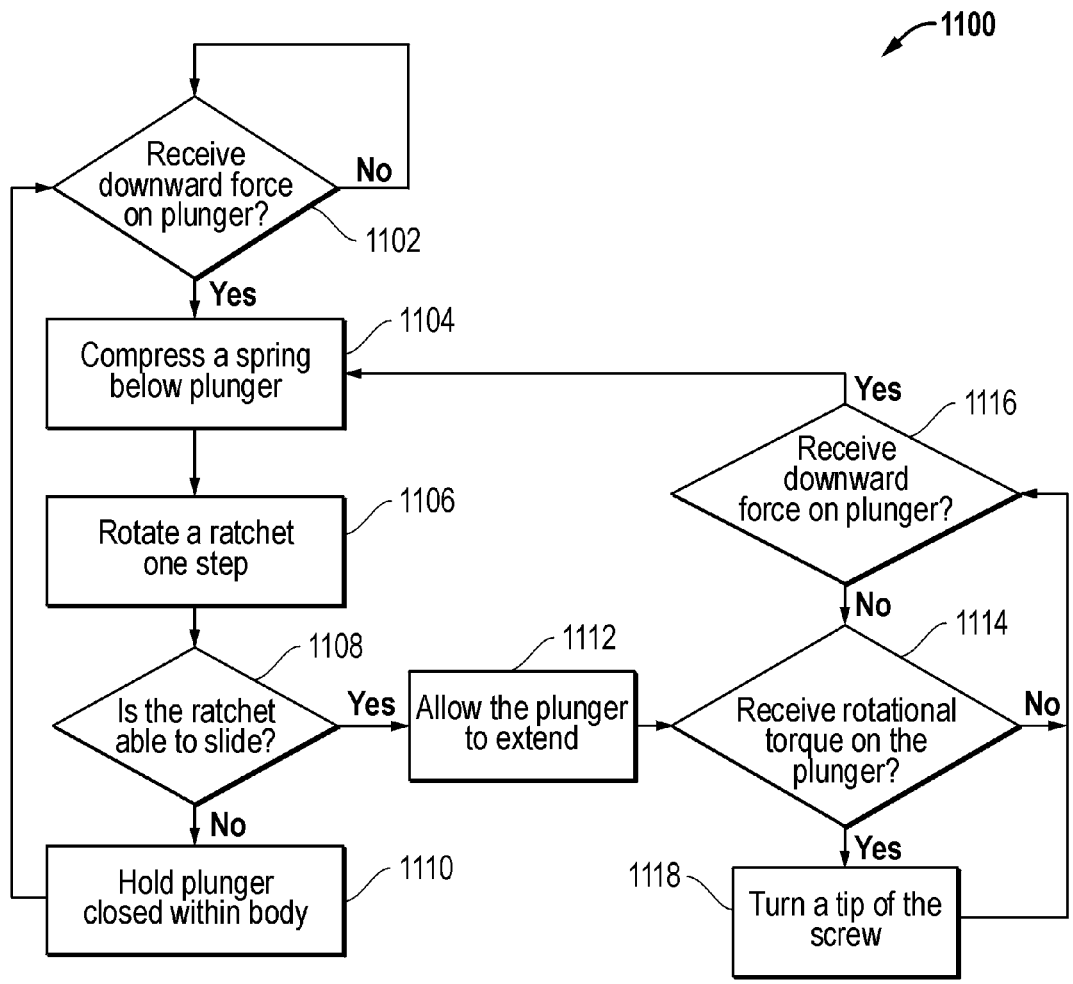
FIG. 11 is a flow diagram of a method for operating the mounting device.

FIG. 11 shows a flow diagram of a method 1100 for operating the mounting device. At block 1102, a determination is made as to whether downward force is received on a plunger. If downward force is received on the plunger, then a ratchet that is in physical communication with the plunger compresses a spring at block 1104. If no downward force is received, then the determination is made again until the downward force is received. At block 1106, the ratchet is rotated one step with a body of the mounting device. Each step alternates the ratchet between a closed and an extended position. A determination is made as to whether the ratchet is able to slide into the extended position at block 1108. At block 1110, if the ratchet is not able to slide into the extended position, then the plunger is held closed within a body of the mounting device and the method continues as stated above at block 1102. However, if the ratchet is able to slide into the extended position, then the plunger is extended from the body and is placed in the extended position at block 1112.

At block 1114, a determination is made whether the plunger either receives rotational torque. If the plunger does not receive rotational torque, then a determination is made whether the plunger received the downward force at block 1116. If the plunger receives downward force the method continues as stated above at block 1104. However, if the plunger does not receive the downward force, then the method continues at block 1114. If the plunger does receive rotational torque, then a tip of the screw is rotated at block 1118 and the method continues at block 1116.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A mounting device comprising:
   a screw including a tip and a head adapted to receive a screw driver;
   a body rotationally fixed in relation to the head of the screw;
   a plunger adapted to extend from the within the body upon receiving a downward force on a top of the plunger and in response receiving an upward force on a bottom of the plunger, and adapted to enable the screw driver to be placed in physical communication with the head of the screw by insertion of the screw driver within an opening of the plunger, the plunger including a plurality of knurls adapted to transfer torque to the tip of the screw; and
   a spring in physical communication with the head of the screw, the spring adapted to place the plunger in an extended position.

2. The mounting device of claim 1 further comprising:
   a ratchet in physical communication with the spring, the ratchet adapted to allow an extension and a closing of the plunger.

3. The mounting device of claim 1 wherein a plurality of keys of the plunger is adapted to provide a frictional force between the plunger and the body.

4. The mounting device of claim 1 wherein the plunger includes an exterior perimeter having any shape.

5. The mounting device of claim 1 wherein the plunger includes a circular shaped exterior perimeter.

6. A computer system comprising:
   a shroud cover; and
   a screw including a head and a tip, the screw adapted to hold the shroud cover in physical communication with a component;
   a body attached to the head of the screw and in physical communication with the shroud cover;
   a plunger adapted to extend from the within the body upon receiving a downward force on a top of the plunger and in response receiving an upward force on a bottom of the plunger, the plunger including a plurality of knurls adapted to transfer torque to the tip of the screw; and
   a spring in physical communication with the head of the screw, the spring adapted to place the plunger in an extended position.

7. The computer system of claim 6 further comprising:
   a ratchet is physical communication with the spring, the ratchet adapted to allow an extension and a closing of the plunger.

8. The computer system of claim 6 wherein a plurality of keys of the plunger is further adapted to provide a frictional force between the plunger and the body.

9. The computer system of claim 6 wherein the plunger includes an exterior perimeter having any shape.

10. The computer system of claim 6 wherein the plunger includes a circular shaped exterior perimeter.

11. The computer system of claim 6 wherein the plunger is further adapted to receive a screw driver for an application of the torque to the tip of the screw.

* * * * *